Figure 1B:
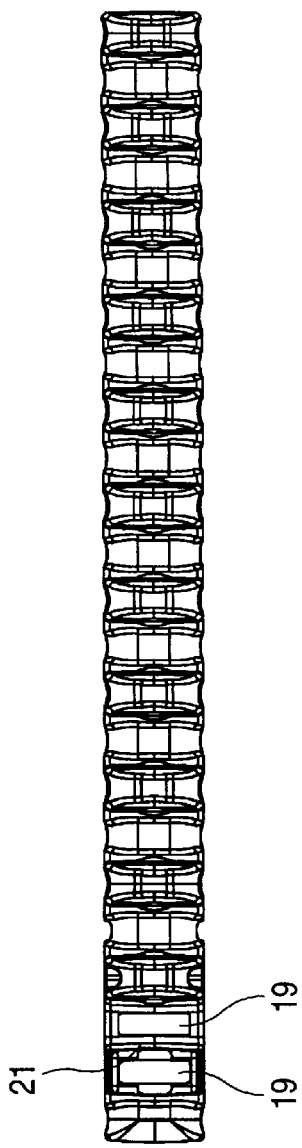

United States Patent [19]
Damkjær et al.

[11] Patent Number: 6,073,756
[45] Date of Patent: Jun. 13, 2000

[54] SIDE-FLEXING CONVEYOR BELT

[75] Inventors: Poul Erik Damkjær, Vejle Øst; John Haue Damkjær, Daugård, both of Denmark

[73] Assignee: Uni-Chains A/S, Vejle, Denmark

[21] Appl. No.: 09/065,449

[22] Filed: Apr. 24, 1998

[30] Foreign Application Priority Data

Jan. 23, 1998 [DK] Denmark ................................ 0086/98

[51] Int. Cl.[7] .................................................. B65G 17/06
[52] U.S. Cl. ........................................ 198/853; 198/850
[58] Field of Search .................................. 198/850, 851, 198/853

[56] References Cited

U.S. PATENT DOCUMENTS

| 4,893,710 | 1/1990 | Bailey et al. | 198/853 |
| 5,379,883 | 1/1995 | Damkjaer | 198/853 |
| 5,547,071 | 8/1996 | Palmaer et al. | 198/853 |
| 5,899,322 | 5/1999 | Gamble, Jr. | 198/853 |

FOREIGN PATENT DOCUMENTS 0663354  7/1995  European Pat. Off. .

*Primary Examiner*—James R. Bidwell
*Attorney, Agent, or Firm*—Antonelli, Terry, Stout & Kraus, LLP

[57] ABSTRACT

Side-flexing conveyor belt built up of a number of chain links which are joined together in a hinge-like manner by means of transverse rods (5, 6) through openings in the individual chain links. Use is made of chain links of at least two types, i.e. edge chain links (1, 2) with one-sided reinforcement (18), and module chain links (3, 4) between the edge chain links. The chain links of both types can be configured in various module breadths, and the individual links are staggered in relation to one another. Each link has a first row of eye parts (12) with mutual intervals between them in the transverse direction, and with elongated holes in line with one another for the engagement of a transverse rod, and a second row of eye parts (11) disposed midway between the first-mentioned eye parts and with holes in line with one another for the engagement of a second transverse rod, and the two sets of eye parts are held together by a transversely-extending bridge part. The edge chain links' one-sided reinforcement (18) extends over at least one eye part for each row, so that at least one eye part is replaced by at least one traction side plate (7) in each link, in that said side plates have transverse openings corresponding to the eye part's openings and elongated holes and are in engagement with adjacent rods (5, 6).

26 Claims, 15 Drawing Sheets

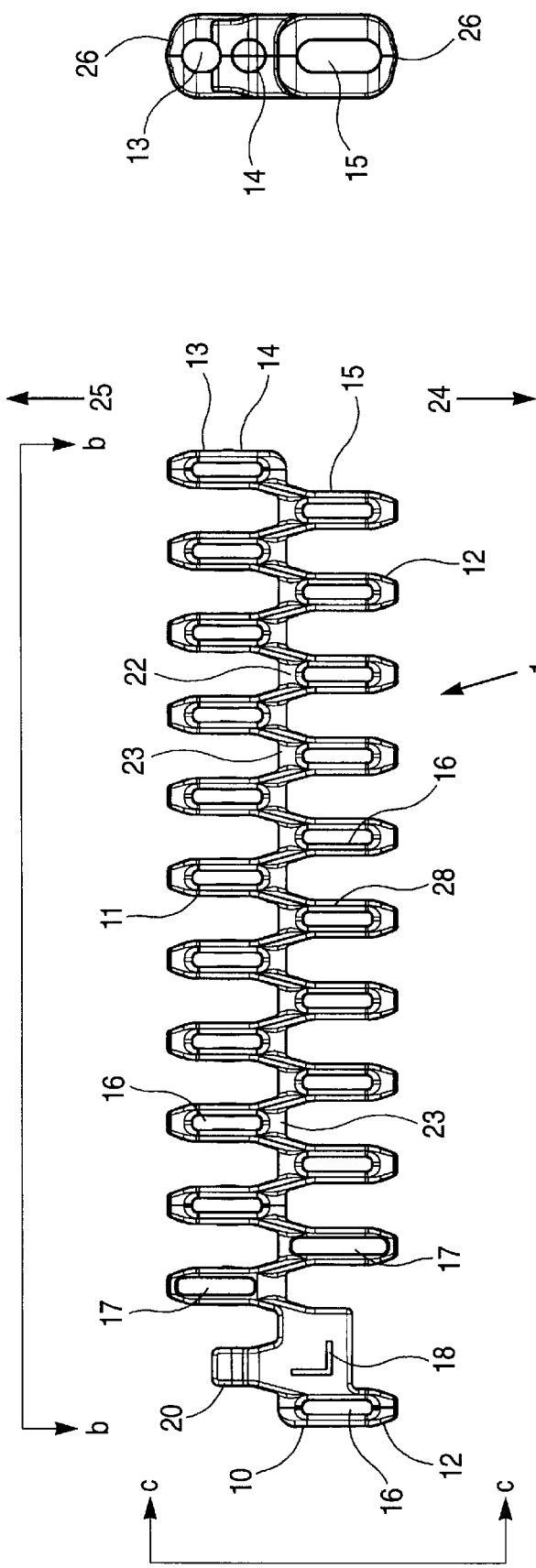

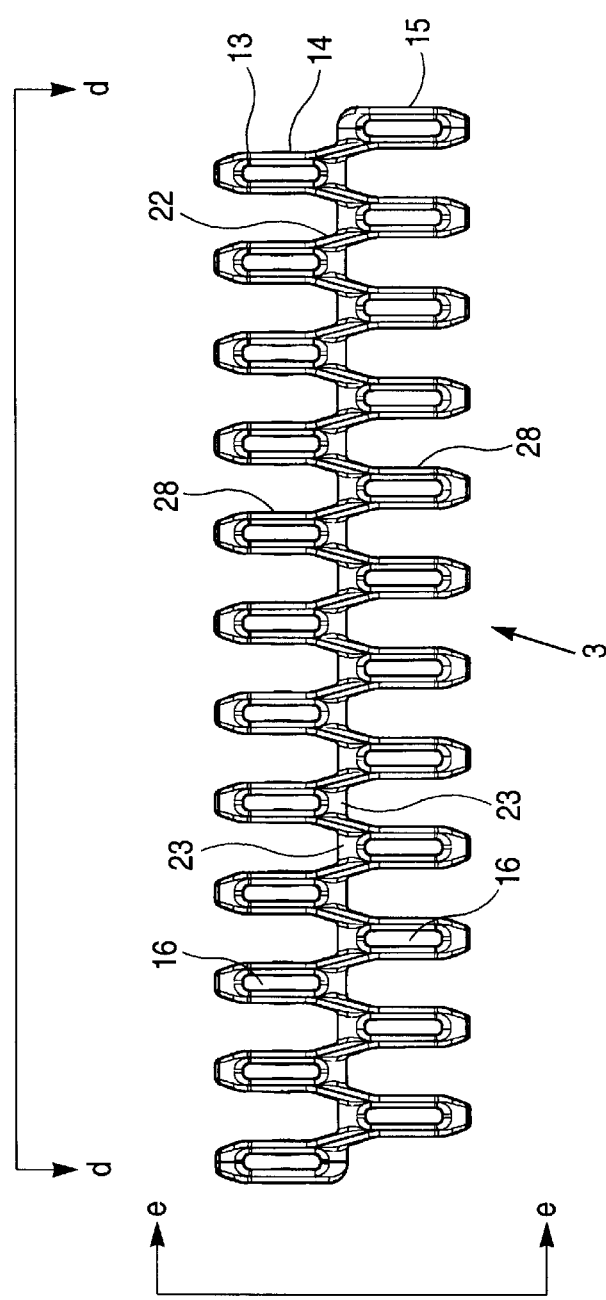
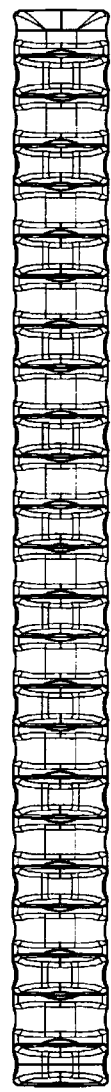
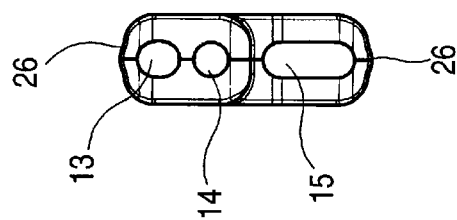

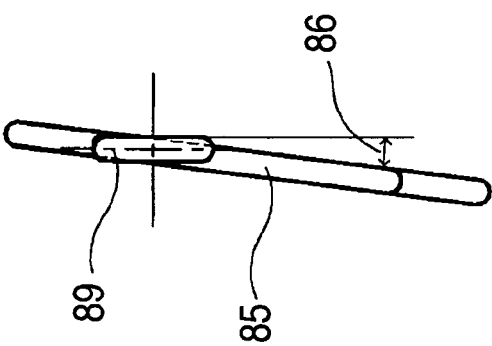
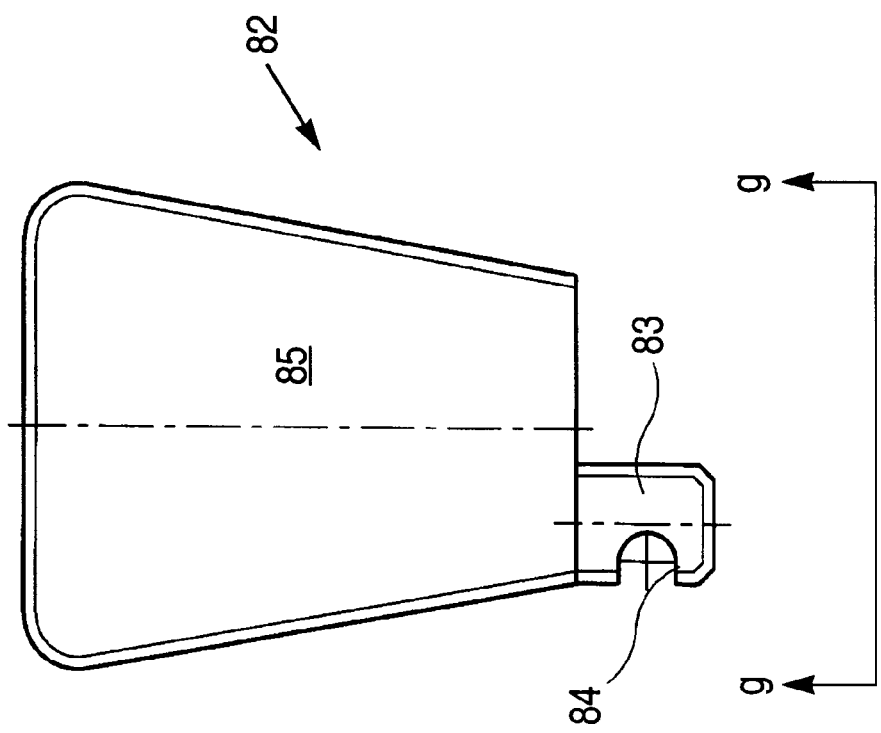
Fig. 13B
Fig. 13A

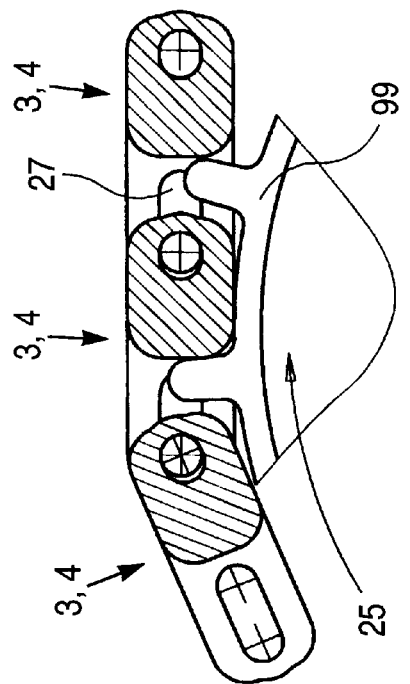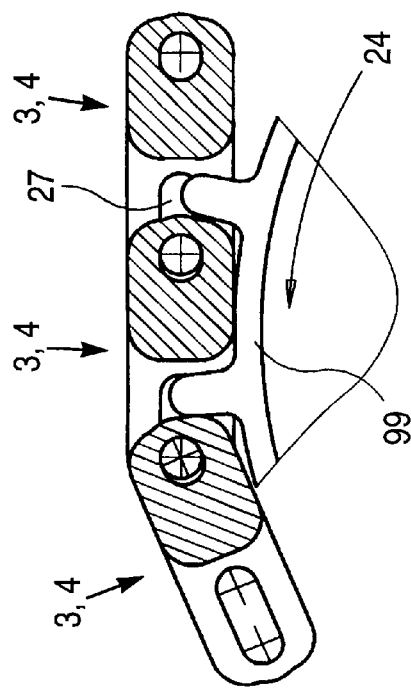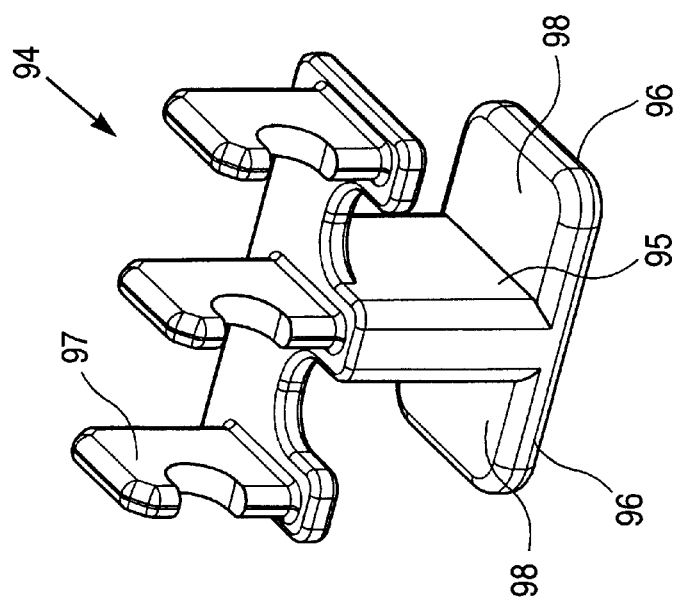

SIDE-FLEXING CONVEYOR BELT

PRIOR ART TECHNIQUE

The invention concerns a side-flexing conveyor belt of the kind disclosed in the preamble to claim 1 or the preamble to claim 21.

Side-flexing conveyor belts built up from a large number of chain links, substantially as disclosed in the preamble to claim 1, are known in a number of different embodiments.

The individual chain links, and in many cases also the transverse rods which hold these together, are made of plastic by injection moulding or in another known manner. Plastic has many advantages which make the material suitable for this use, and therefore it is used to a great extent for straight-flow conveyor belts. If the conveyor belt is to be side-flexing, i.e. be capable of running in curves in the horizontal plane, ordinary conveyor belts of plastic and with plastic rods are of sufficient strength only if the belt is not loaded too much. This is due partly to the material and partly that the whole of the traction when the belt runs in curves is transferred along the edge of the belt outermost in the curve. In order to increase the strength in the outer edge of the belt, this can be reinforced, i.e. configured with a greater amount of material or material thickness than the rest of the belt. Such belt types are known, e.g. from European Patent No. 0 663 354 or U.S. Pat. No. 5,547,071. For the strengthening of the outer edge of the belt, on the outside of the chain links, i.e. on the pivot rods outside the links, reinforcement elements can be mounted, e.g. side plates, which connect the pivot rods and ensure transfer of the necessary traction when the belt is stretched out along the outer edge in a curve. However, it is a great disadvantage to have reinforcement elements in the form of side plates, steel wire or the like disposed on the outside of the chain links, in that this gives problems at the transition between the outer edge of the belt and the stationary edge on the frame which supports the conveyor. These configurations also result in adjacent belts not being able to be placed sufficiently close together, nor can dead-plates or other transfer means be placed up against the belt's outer edge for sideways transfer of items to or from the conveyor.

The chain links of the known types for the construction of conveyor belts seldom have sufficiently great tensile strength, in that the tensile strength of the known types is of the magnitude of up to approx. 150 kg. This means that there are considerable limitations on how great a load can be applied to a conveyor belt, and it also places limitations on how quickly the belt can run and limitations on the length with which a conveyor can be built.

The known side-flexing conveyor belts also suffer the disadvantage that large openings can arise in the surface, so that articles such as small containers on the belt can tip over, e.g. if they are in the form of small cans or plastic bottles for soft drinks. Such containers often have a bottom surface which is not flat but configured with so-called point supports.

ADVANTAGES OF THE INVENTION

By configuring the conveyor belt according to the invention as disclosed and characterized in claim 1 or in claim 21, it is achieved that the belt is given much greater strength and has relatively small openings in the surface, even when running in curves.

The belt according to the invention as disclosed in claim 1 is built up of special outer links and module chain links which are assembled with rods to form an endless belt of the desired breadth, in that in the conveying direction the links are staggered in relation to one another like bricks in a wall. The one-sided reinforcement areas existing in the edge links, i.e. the areas at the outer edge of the belt, where a thicker or a greater amount of material is used than in the rest of the belt, are made so large that they extend over at least one eye part for each row of eye parts, and in such a manner that there is room for at least one eye part to be replaced by a traction side plate, which has considerably greater strength than the eye parts in the edge chain link. There is hereby achieved a belt with a tensile strength which is up to several times greater than with the known belts, i.e. in the order of 3–6000 kg, depending on the type of material the side plates are made of, and depending on whether plastic or steel rods are used.

The belt according to the invention, and as disclosed in claim 21, is configured in such a manner that the individual parts in the chain links have certain, relative dimensions, which ensures that only minimal openings arise in the belt when it is running in curves, and that the openings are generally distributed over the surface of the belt, so that even small plastic bottles with point-formed bottoms cannot tip over when being conveyed.

By placing the side plates in the belt according to the invention, i.e. "integrated" in the edge chain link, a number of important advantages are achieved. The belt according to the invention can run very closely to an adjacent belt, and thus in this manner it is possible to effect sideways transfer, or several belts can be allowed to run together to form a very broad conveyor. A belt according to the invention can run quite closely up against a dead-plate at the side of the belt, so that sideways transfer can be effected both to and from the belt without any problems and without any risk of the conveyed items tipping over. The special configuration of the edge chain links according to the invention also makes it possible for a side-flexing conveyor belt according to the invention to be run quite closely up against the edge of the supporting frame, so that slots or openings do not appear along the outer edge of the belt with the risk that items outermost on the belt can tip over, or that parts of such items can get jammed between the belt and the supporting frame.

Furthermore, the belt according to the invention is configured in such a manner that it can be driven in both directions, which is of great importance, e.g. when relieving pile-ups on the belt in connection with the stopping of a production machine to which one or more conveyor belts according to the invention are coupled.

Finally, the increased tensile strength makes it possible for side-flexing conveyors with the belt according to the invention to be built up in greater lengths than is the case with the known constructions.

As disclosed and characterized in claim 2, the side plates in the conveyor belt according to the invention can be placed at a distance from the outer edge of the belt. This makes it possible for the transverse rods to be in engagement with the edge chain link, i.e. with the edge chain link's eye parts on both sides of each side plate, which contributes towards a further increase in the tensile strength of the belt, in that an undesired bending effect on the outer end of the rod is avoided.

The side plates are preferably configured as disclosed and characterized in claim 3, in that it is hereby achieved that they can be disposed "internally" in the edge chain links, and can thus not come into contact with the items which are conveyed on the belt, or in contact with parts under the belt, e.g. slide rails on which the belt is fed forward, or come into contact with the edge rails of the conveyor.

The edge chain links in the conveyor belt according to the invention are preferably configured as disclosed and characterized in claim 4. It is hereby achieved that the side plates are secured from the point of view of position, so that they cannot tip over during the running of the belt, e.g. those side plates which lie innermost in a curve when running in curves, and which consequently are not subject to any tractional influence. By avoiding the tipping over of the side plates, their influence on the rods and herewith the wear on the rods is reduced.

The edge chain links in a conveyor belt according to the invention can be configured as disclosed and characterized in claim 5 or in claim 6. Side plates in adjacent links can hereby be held at a distance from each other, which gives the belt very great stability, and it is completely avoided that adjacent side plates can influence each other during operation.

The side plates in the edge chain links in the conveyor belt according to the invention are normally made of ordinary steel, as disclosed and characterized in claim 7, but they can also be made of special steel with high tensile strength when there is use for a conveyor belt with particularly high tensile strength, e.g. for the conveying of heavy items such as large, filled bottles, large canned goods or the like.

As disclosed and characterized in claim 8, the side plates can also be made of plastic, possibly reinforced or fibre-strengthened plastic. For example, plastic side plates are used if it is not desired to have steel parts in the belt, or if plastic side plates provide the relevant conveyor with adequate tensile strength.

The individual chain links in the conveyor belt according to the invention, i.e. both the edge chain links and the module chain links, are preferably configured as disclosed and characterized in claim 9. The possibility is hereby provided for the insertion, at any point across the breadth of the belt, of blocking elements for the movement of the transverse rods in the sideways direction. Use can thus be made of transverse rods of full breadth, as disclosed in claim 11, or the rods can be divided into several pieces, cf. claim 10. For many applications it will be advantageous to use steel rod parts in the area at the side plates at each side of the belt, and let the centremost rod piece be a plastic rod. A great reduction in weight is thus achieved in comparison with that when only steel rods are used, and without any reduction in the tensile strength of the conveyor belt. The plastic rod parts are flexible and do not normally bend in the same manner as steel rods in case of a high overloading of the belt in a single spot, which is a further advantage with the use of plastic rods, except for the rod parts at the side plates.

The through-going openings also make it possible for the conveyor belt according to the invention to be mounted with various forms of auxiliary parts etc. Moreover, the openings reduce the weight of the belt and reduce material consumption.

As disclosed in more detail in the claims 12–15, the edge chain links in the conveyor belt according to the invention can be configured with retaining elements facing downwards from underneath. It is hereby avoided that the belt is lifted from the underlayer at the outer edge when the belt is running in curves, without the necessity of providing retaining means which extend in over the belt at the outer edge of the curve. This principle is known from the applicant's U.S. Pat. No. 5,379,883.

If the downwardly-facing retaining elements are independent elements mounted on the edge chain links, these retaining elements comprise securing parts which are arranged to engage with the transverse rods, so that they can hold the belt down in place, even at very high traction.

If the conveyor belt according to the invention is to be used for running at an angle upwards or at an angle downwards, or if it is needed to increase the friction between the belt and the items on the belt, the chain links can be provided with a friction catch-plate which is configured as disclosed and characterized in claim 16. The transverse rods ensure that the friction catch-plates sit firmly fixed on the chain links, even at very high loads.

By configuring the conveyor belt according to the invention as disclosed and characterized in claim 17, in a simple manner it is achieved that the running direction of the belt becomes optional, and that it is possible optionally to bring drive sprockets in engagement with the top or the underside of the belt, all depending on what the requirements are for the relevant application.

With certain applications there can be a need to provide the conveyor belt according to the invention with catch-plate elements or with side-guard elements. These elements are configured as disclosed and characterized in claim 18 or in claim 19, i.e. they are fastened in the through-going openings in the chain links and are in engagement with the traction rods in a manner corresponding to that of the friction catch-plates.

Finally, the conveyor belt according to the invention can be provided with holding elements configured as disclosed and characterized in claim 20. The holding elements are mounted on the underside of the belt in the through-going openings and in engagement with the transverse rods. The holding elements are arranged to engage with rails or the like under the conveyor belt when this is running, e.g. where a belt is fed from a horizontal path to an upwardly-inclined path. The holding elements ensure that the belt cannot be lifted free of the slide rails. The holding elements can also be used for holding the central area of a very broad belt down in place when running in curves.

As explained earlier, the belt according to the invention can be configured with relative dimensions as disclosed in claim 21, hereby providing the possibility of minimizing the openings in the surface of the belt. If the belt according to the invention is further configured with relative dimensions as disclosed in claim 22, a very thin and lightweight belt can be achieved while retaining the possibility of minimal openings in the surface, and moreover this is achieved without any reduction in the tensile strength of the belt.

From the above explanation it will be evident that the conveyor belt according to the invention has many different applications, and that it can be provided in a simple manner with a number of different auxiliary parts.

The individual chain link is injection moulded as a one-part unit of plastic of a suitable type, e.g. Acetal.

One of the types of auxiliary parts which can be mounted are heat-resistant wear elements as disclosed in claims 23–26. By mounting such wear elements on the edges of the belt which face towards the wearing strips which restrict the conveyor in the lateral direction, the running speed of the belt can be considerably increased without this giving rise to any melting of the edge of the belt due to frictional heat at high speeds. Trials with the invention have shown that a considerable increase in speed can be achieved. The chain links themselves are normally moulded in acetate, polypropylene or polyethylene, which can be used at belt speeds up to approx. 50 m/min. This also applies if use is made of wear elements of these materials. If, on the other hand, wear elements of a more heat-resistant material are used, e.g nylon, the melting point is greatly increased, and it becomes possible to use considerably higher feeding speeds, e.g. speeds of 100 m/min. or more.

THE DRAWING

Figure 1C:
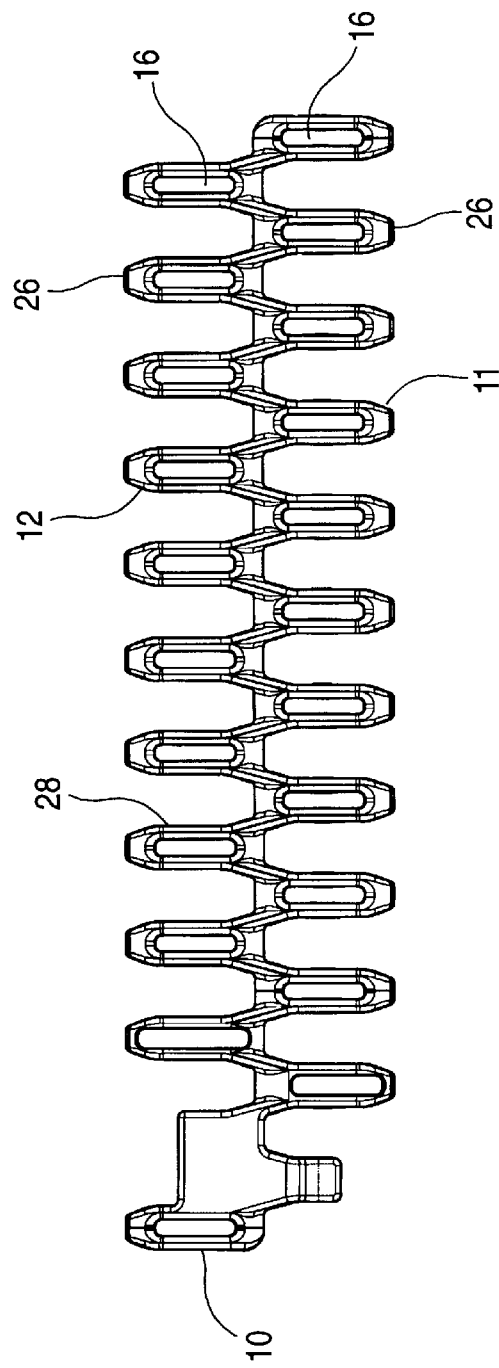
Figure 2:
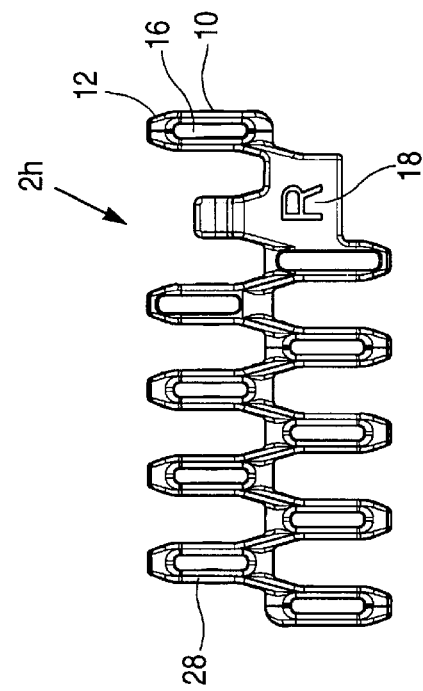
Figure 1E:
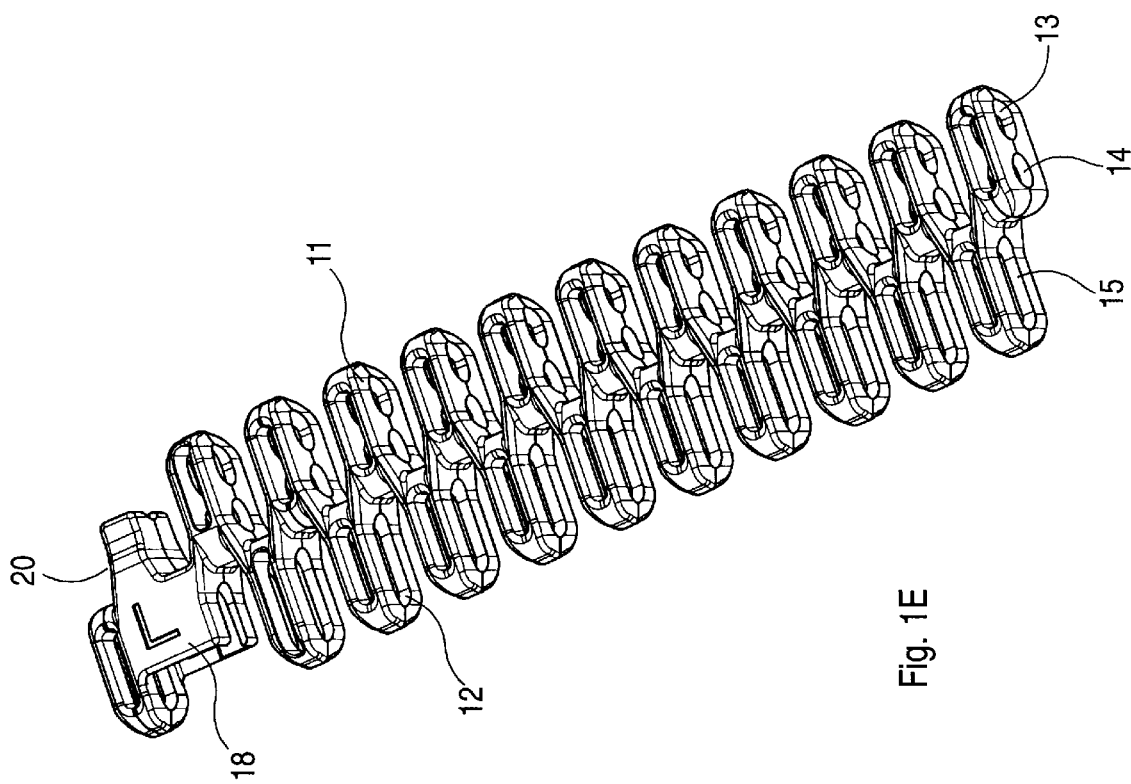
Figure 4:
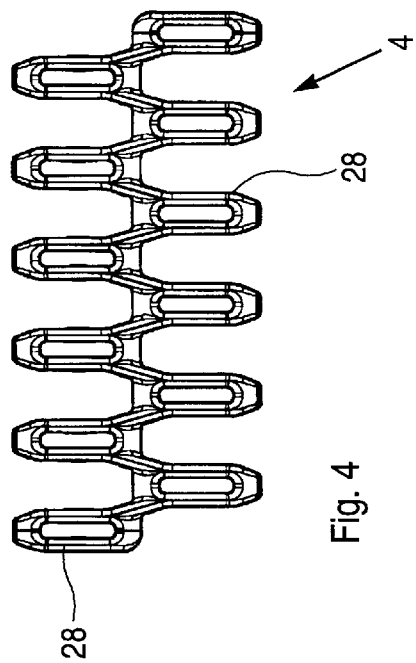
Figure 3D:
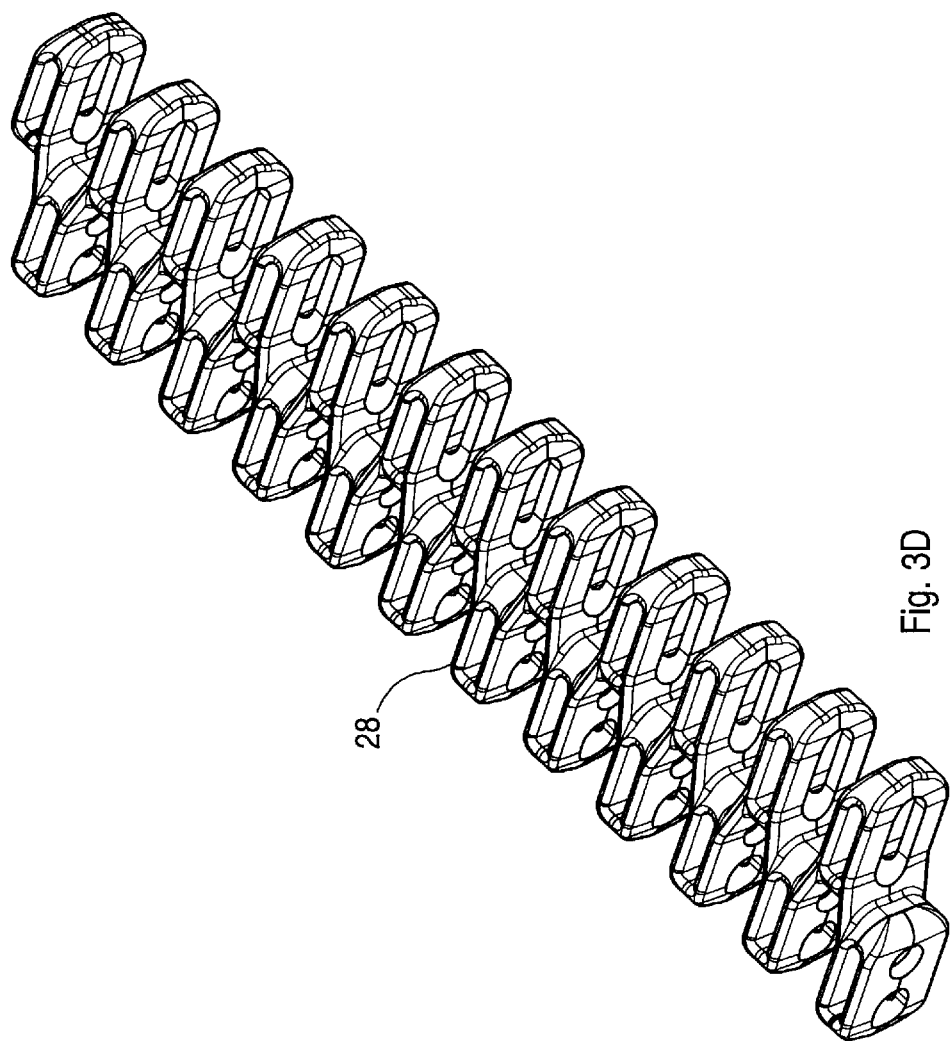
Figure 5:
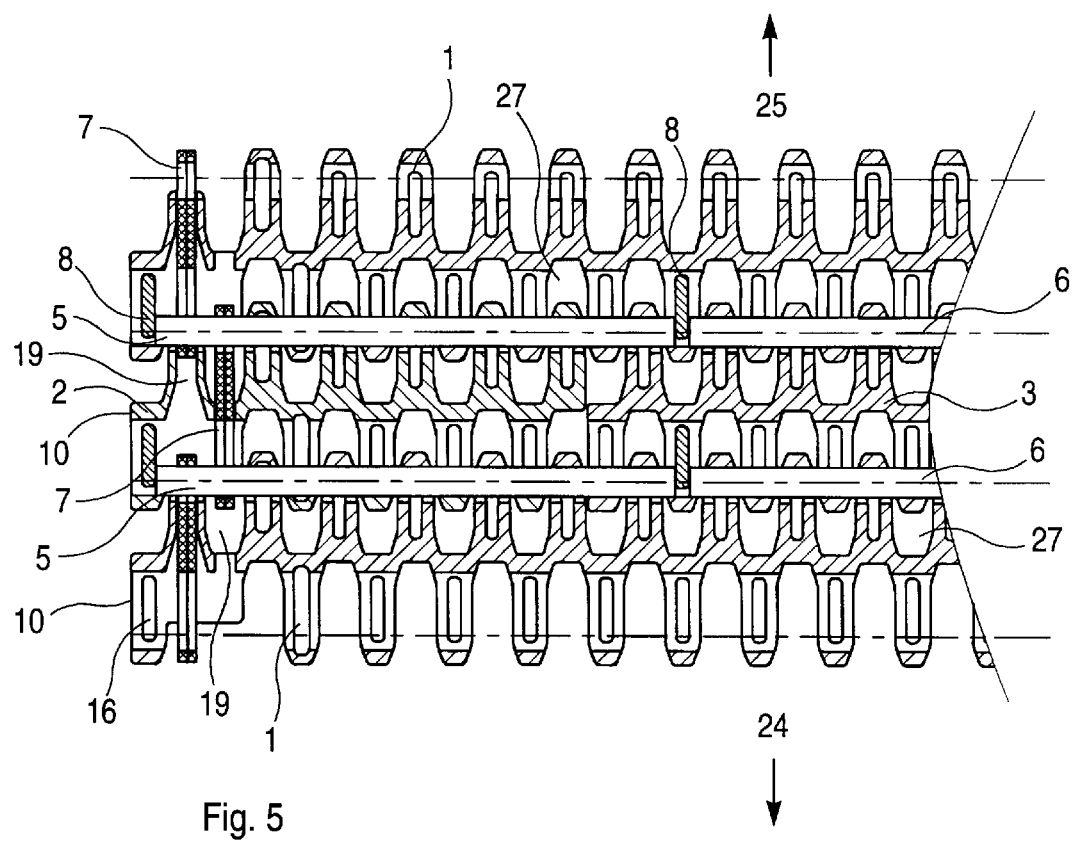
Figure 6:
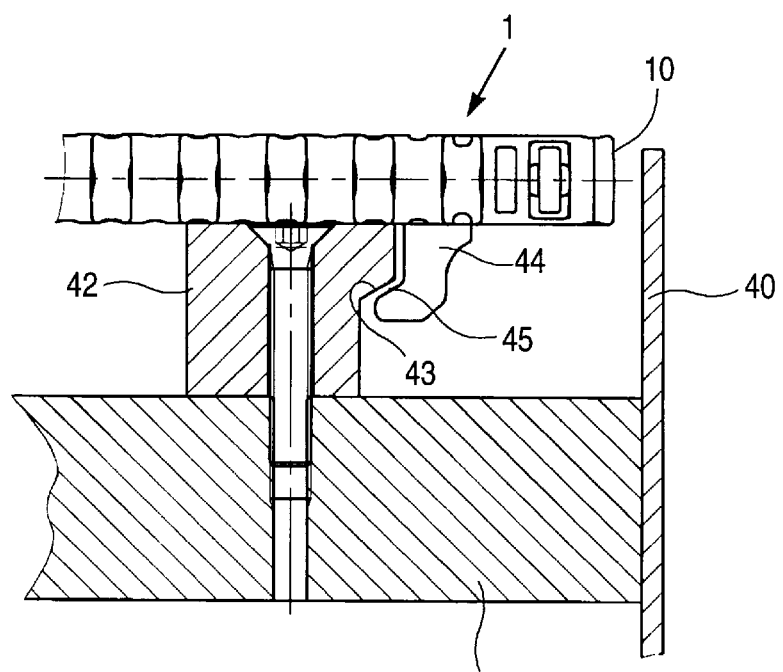
Figure 7A:
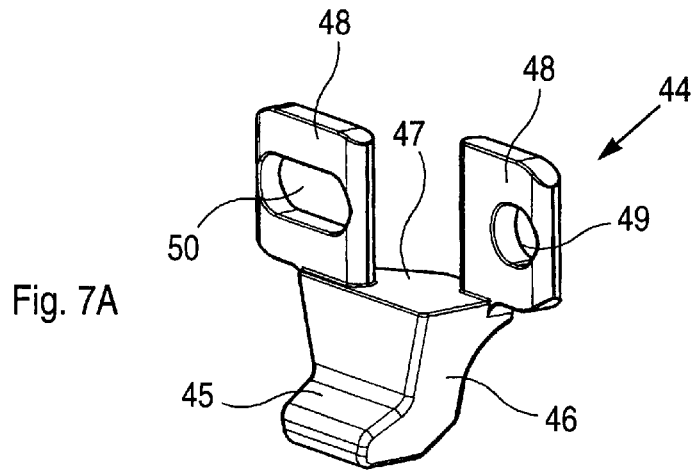
Figure 7B:
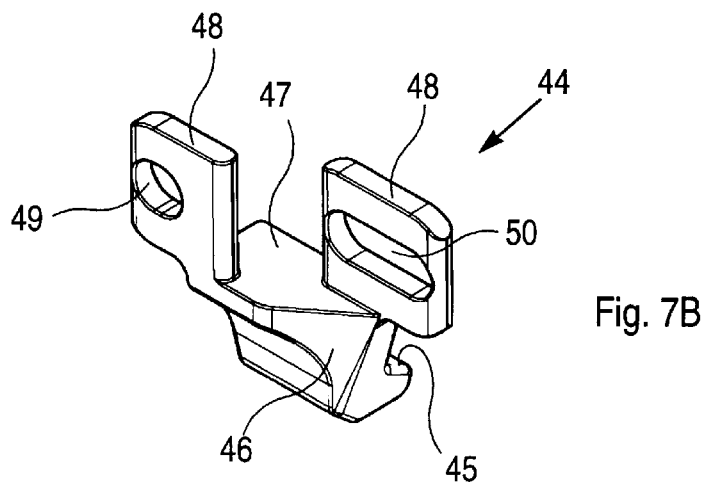
Figure 7C:
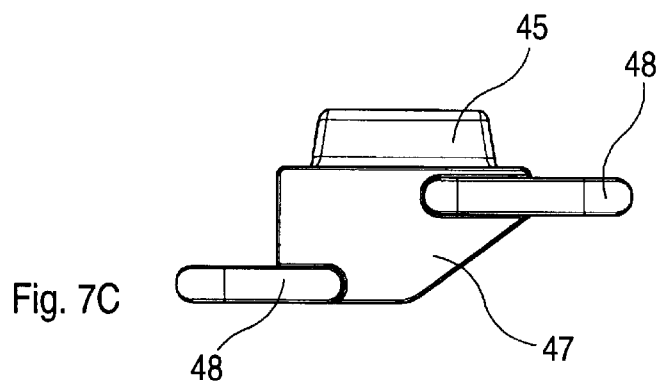
Figure 8A:
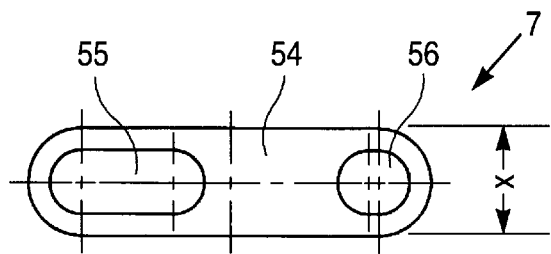
Figure 8B:
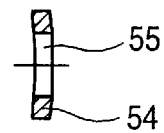
Figure 9:
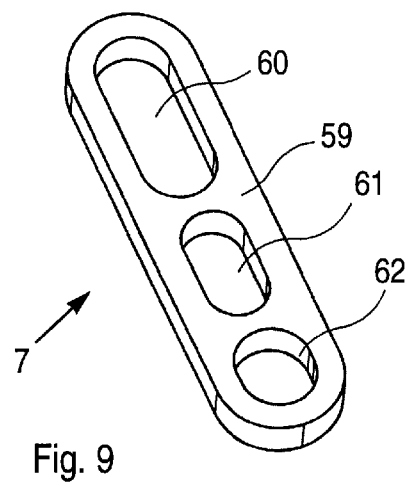
Figure 10:
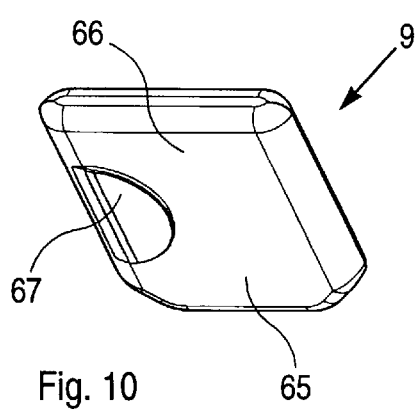
Figure 11:
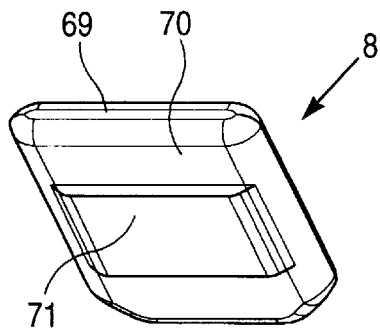
Figure 12A:
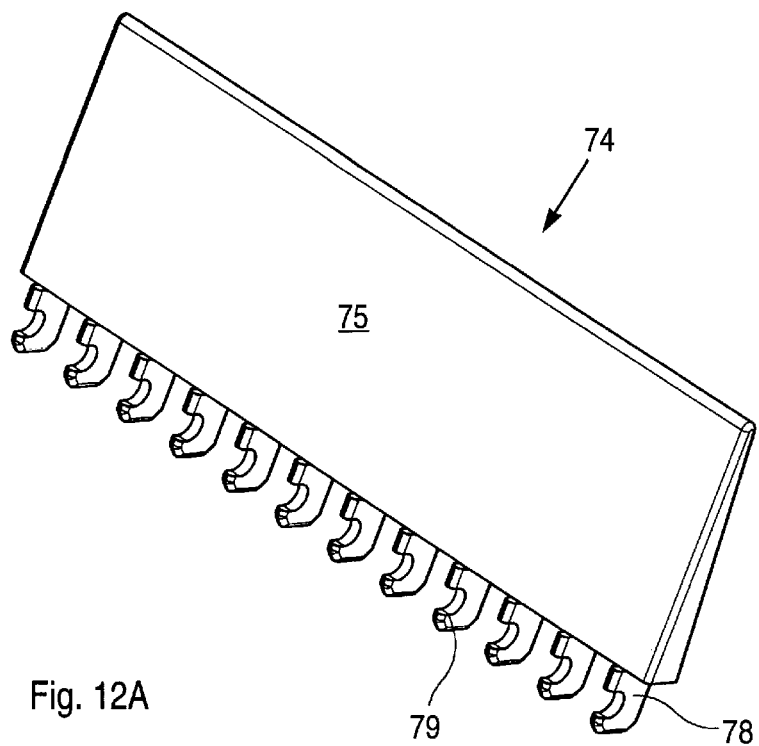
Figure 12B:
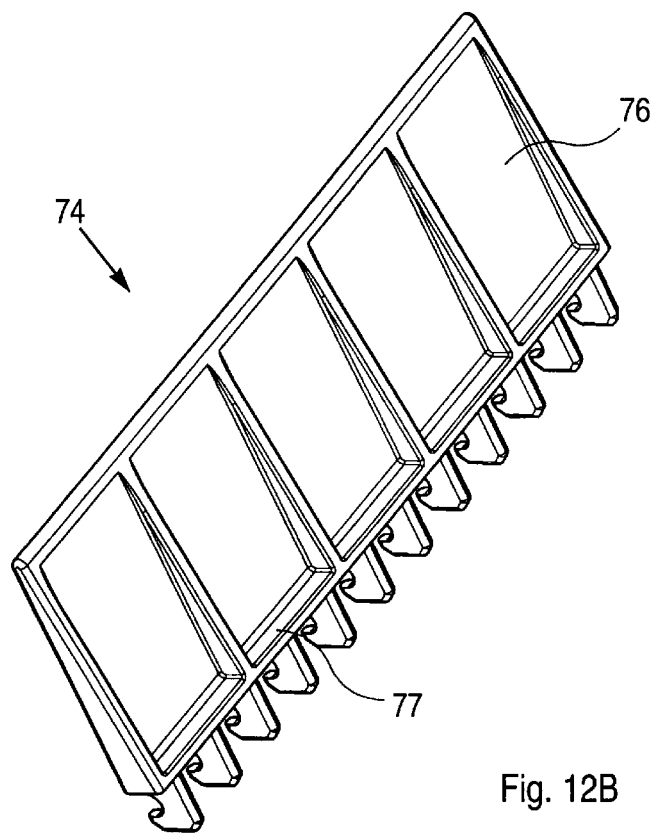
Figure 14C:
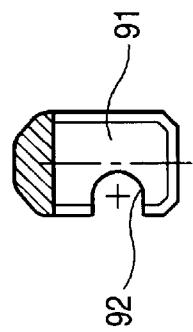
Figure 14A:
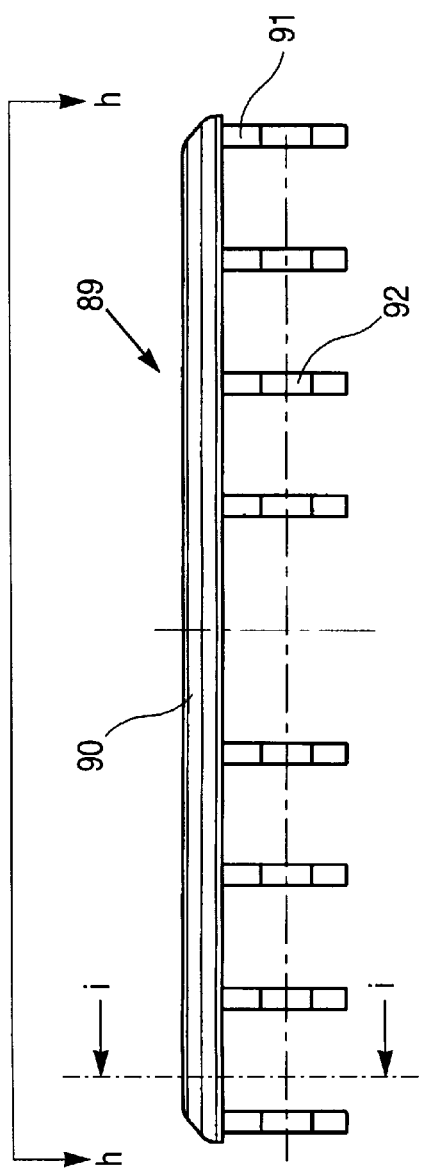
Figure 14B:
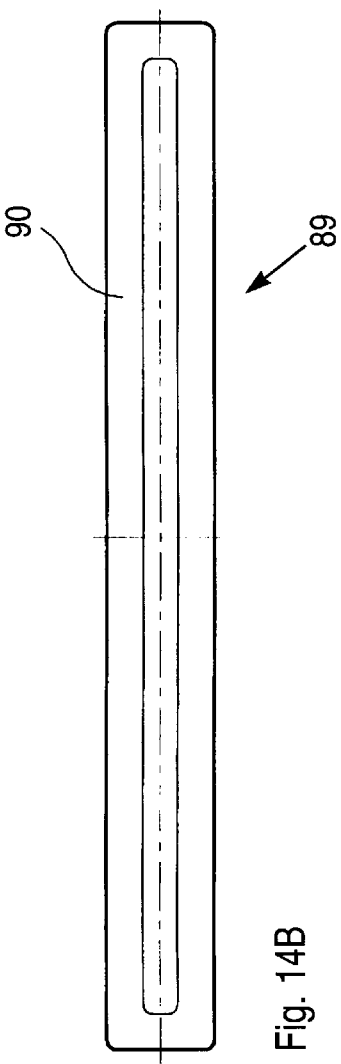
Figure 17:
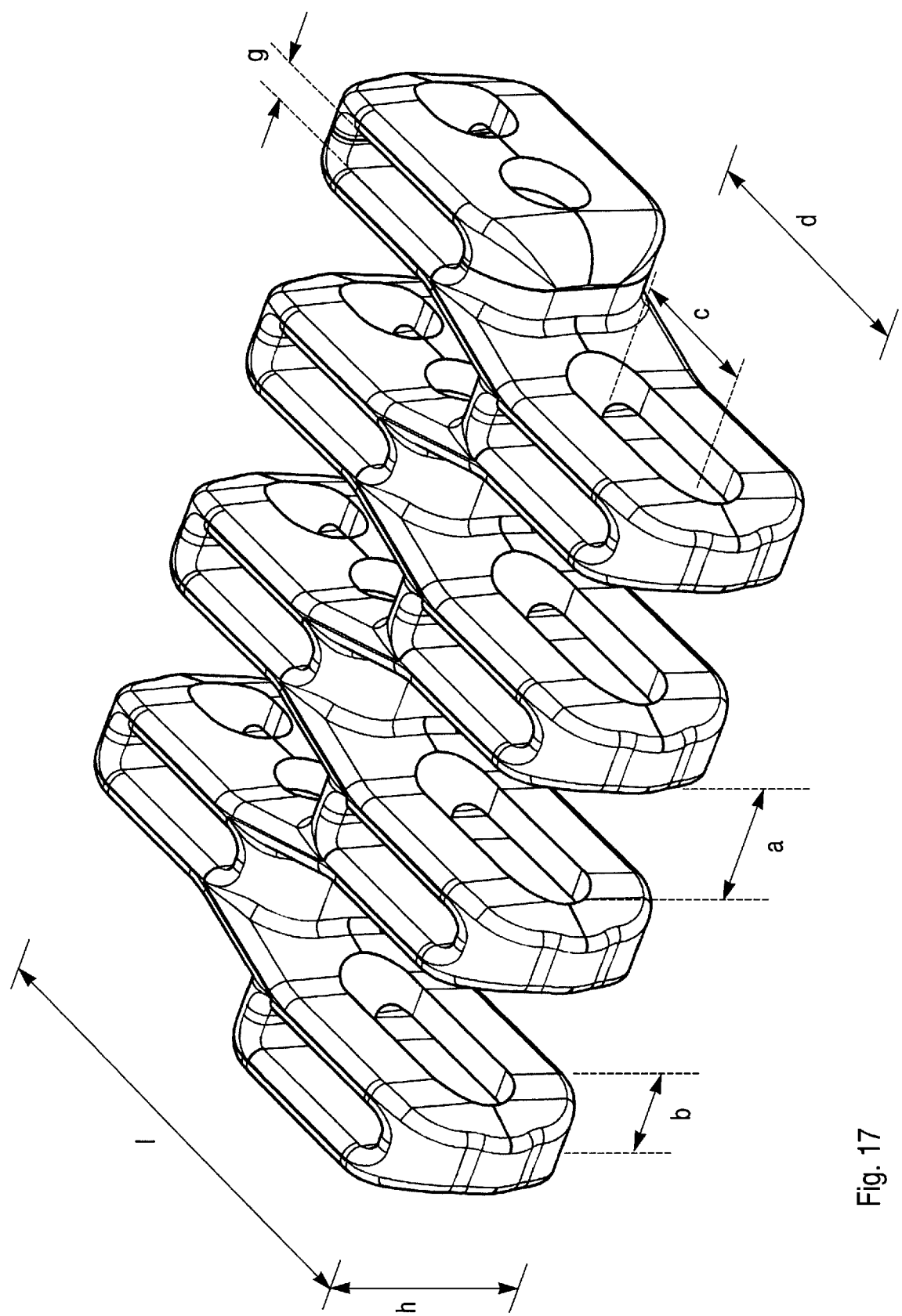
Figure 18A:
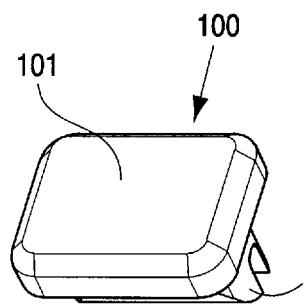
Figure 18B:
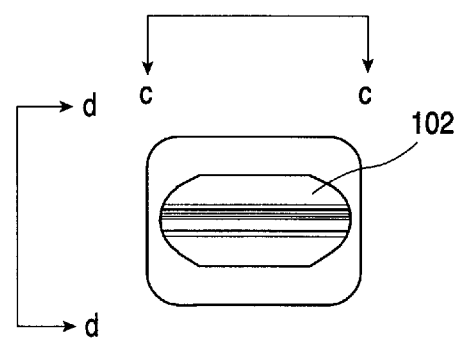
Figure 18C:
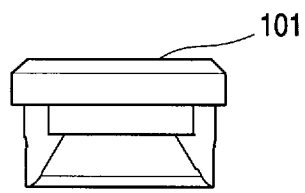
Figure 18D:
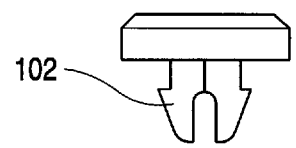
Figure 19A:
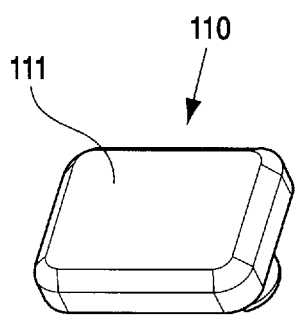
Figure 19B:
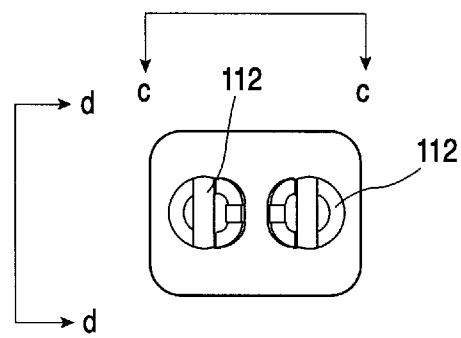
Figure 19C:
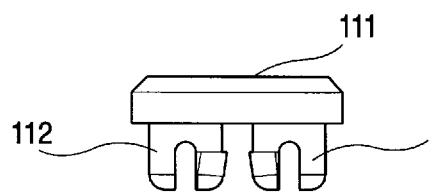
Figure 19D:
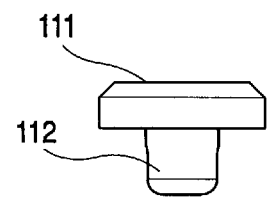
Figure 20:
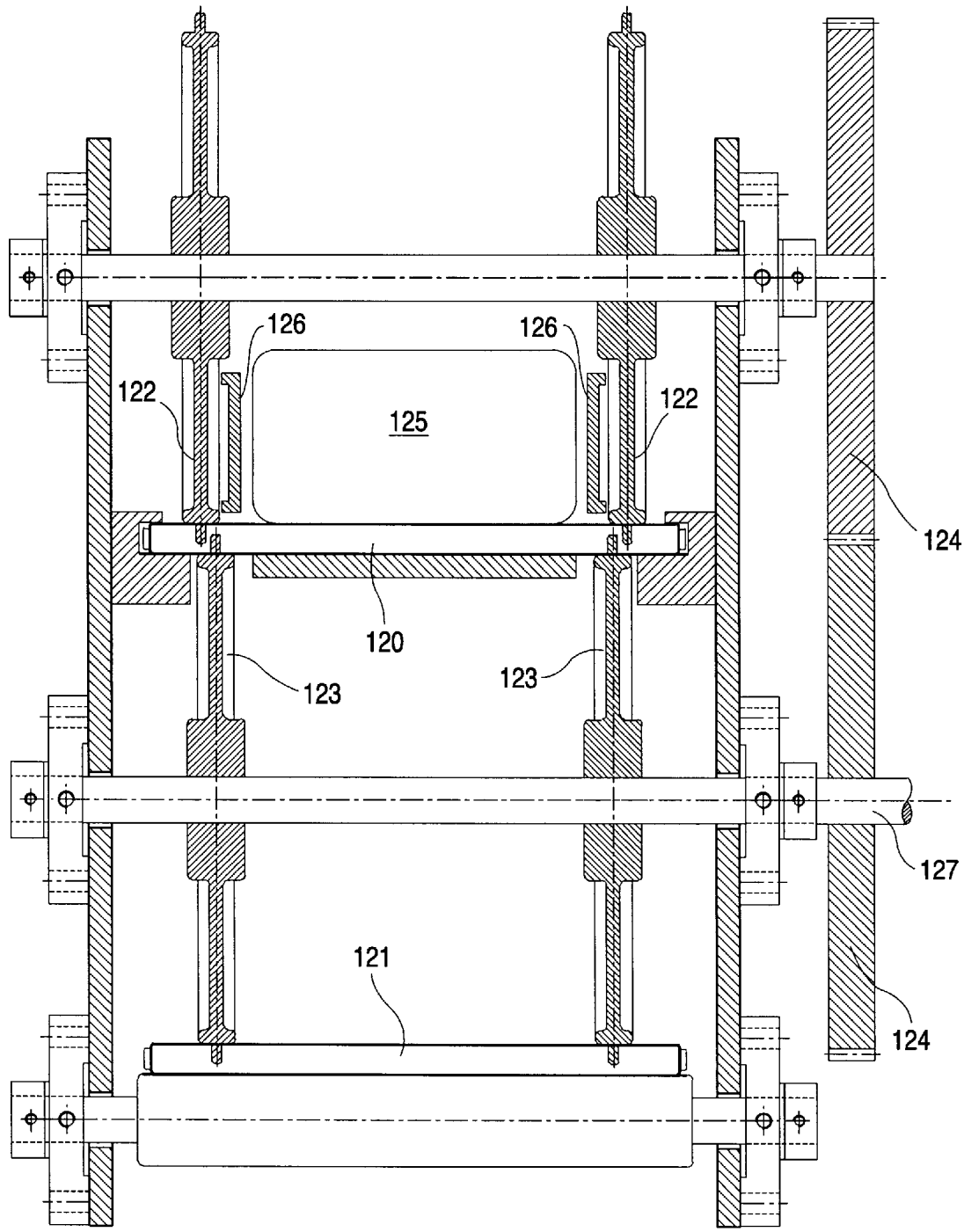

The invention will now be described in more detail with reference to the drawing, where FIG. 1A shows a chain link seen from above and arranged as edge chain link in the left-hand side of the conveyor belt according to the invention, FIG. 1B shows the chain link in FIG. 1A seen in the direction b—b in FIG. 1A, FIG. 1C shows the chain link in FIG. 1A seen from below, i.e. from that side which is normally considered to be the underside of the belt, FIG. 1D shows the chain link in FIG. 1A seen from the end, i.e. in the direction d—d in FIG. 1A, FIG. 1E shows the chain link in FIG. 1A seen in perspective, FIG. 2 shows a chain link corresponding to the link in FIG. 1A, but configured in half-breadth and arranged as edge chain link in the right-hand side of the conveyor belt according to the invention, FIG. 3A shows a chain link seen from above, arranged as a module chain link for mounting in the area between the edge chain links, FIG. 3B shows the chain link in FIG. 3A seen in the direction b—b in FIG. 3A, FIG. 3C shows the chain link in FIG. 3A seen from the end, i.e. in the direction c—c in FIG. 3A, FIG. 3D shows the chain link in FIG. 3A seen in perspective, FIG. 4 shows a chain link corresponding to FIG. 3A but configured in half-breadth, FIG. 5 shows a plane, central section seen from above in a section in the left-hand side of a conveyor belt according to the invention, FIG. 6 shows in priniciple a section in the right-hand side of the conveyor belt in FIG. 5, and showing means, including downwardly-facing holding elements, for avoiding the lifting of the belt when running in curves, FIG. 7A shows a holding element in perspective, cf. FIG. 6, FIG. 7B shows the holding element in FIG. 7A seen from the opposite side, FIG. 7C shows the holding element in FIG. 7A seen from above, FIG. 8A shows on a slightly larger scale a steel side plate for insertion in the reinforcement area in the chain links in FIGS. 1 and 2 and in FIG. 5, FIG. 8B shows a section in FIG. 8A, FIG. 9 shows an example of a side plate moulded in plastic, FIG. 10 shows on a larger scale an embodiment of a blocking element for the transverse rods, FIG. 11 shows a second embodiment of a blocking element, FIG. 12A shows a catch-plate element seen in perspective, FIG. 12B shows the catch-plate element seen from the opposite side, FIG. 13A shows the side-guard element seen from the side, FIG. 13B shows the side-guard element in FIG. 13A seen from below, i.e. in the direction g—g in FIG. 13A, FIG. 14A shows a friction catch-plate seen from the side, FIG. 14B shows the friction catch-plate in FIG. 14A but seen from above, i.e. in the direction h—h in FIG. 14A, FIG. 14C shows a section in the catch-plate in FIG. 14A in the direction i—i, FIG. 15 shows in perspective a holding element for the conveyor belt according to the invention, FIG. 16A shows a drive wheel in engagement with the conveyor belt according to the invention when running in a first direction, FIG. 16B shows a drive wheel in engagement with the conveyor belt when running in the opposite direction in relation to FIG. 16A, FIG. 17 shows on a larger scale a section of a chain link according to the invention in connection with the determination of the mutual dimensions of the parts, FIG. 18A shows in perspective a first embodiment of a wear element arranged for assembly in the edge of the conveyor belt, FIG. 18B shows the element in FIG. 18A seen from below, FIG. 18C shows the element in FIG. 18B seen in the direction c—c, FIG. 18D shows the element in FIG. 18B seen in the direction d—d, FIG. 19A shows in perspective a second embodiment of a wear element arranged for assembly in the edge of the conveyor belt, FIG. 19B shows the element in FIG. 19A seen from below, FIG. 19C shows the element in FIG. 19B seen in the direction c—c, FIG. 19D shows the element in FIG. 19B seen in the direction d—d, FIG. 20 shows a plane section in a drive station for a conveyor belt according to the invention, which is in engagement with both the feeding part of the conveyor belt and the belt's underlying return part.

EXPLANATION OF EMBODIMENTS ACCORDING TO THE INVENTION

In FIG. 5 of the drawing there is shown a plane, circular section in a section in the one side of a conveyor belt according to the invention which can have an optional running direction 24 or 25. In the preceding figures, i.e. FIGS. 1–4, the edge chain links (FIGS. 1 and 2) and module chain links (FIGS. 3 and 4) which are used are shown in more detail.

The section in FIG. 5 shows that the belt is composed of edge chain links 1 and 2 and module chain links 3 and 4 with the use of transverse rods 5, 6 through openings 13, 15 in the eye parts 11, 12, see FIGS. 1 to 4.

The edge chain links 1, 2h in FIGS. 1 and 2 comprise outermost, i.e. in that side which shall constitute the edge of the conveyor belt, a reinforcement area 18, i.e. an area configured with greater material thickness to provide increased tensile strength, and a central, symmetrical bridge part 22 from which eye parts 11, 12 extend in the running directions of the belt. The eye parts in the one side are staggered in relation to the eye parts in the other side, so that an eye part for the one side lies opposite the space between two adjacent eye parts for the other side.

Each eye part 11 for the one side has a transverse opening 13 for a rod 5, 6. The transverse openings 13 are substantially circular and are in line with one another in the transverse direction. In addition, further in towards the central bridge part 22, each of these eye parts 11 have a further transverse, preferably circular, through-going opening 14. These openings 14 are also in line with one another, but their primary object is to reduce the consumption of material and the weight of the chain link, but they are also used for the securing of blocking elements for the rods through the openings 16, 17, which is explained later in connection with reference to FIG. 10. The openings 14 are preferably slightly smaller than the openings 13, preferably so much smaller that the transverse rods cannot be inserted herein.

To the other side, each eye part 12 has long holes 15 which are elongated in the running direction, and which are in line with one another in the transverse direction. These long holes are intended for engagement with the rods in the adjacent chain link in a hinge-like manner, and make it possible for the conveyor belt to be side-flexing in a manner corresponding to that shown in the aforementioned patent publications.

Moreover, each of the said eye parts 11, 12 is configured with a through-going opening 16, 17 extending from the chain link's upperside to its underside. There is hereby achieved a further reduction in the weight and material consumption, but what is more important is that the possibility is hereby provided for the insertion across the whole breadth of the chain link of blocking elements 8, 9 for restricting the movement of the rod pieces 5, 6 in the sideways direction, which is shown in FIG. 5, and which is discussed later in connection with FIGS. 10 and 11. Furthermore, the openings 16, 17 can be used for the mounting of various parts on the top or underside of the conveyor belt, which is explained later in connection with FIGS. 7 and 12–15 of the drawing.

Furthermore, it is seen in FIG. 1 that the central bridge part 22, which is moulded as a one-part unit with the eye parts 11, 12 and reinforcement area 18, is configured symmetrically around a vertical, central plane, and such that those areas which lie between the adjacent eye parts 11 or 12 have rounded-off surfaces 23 which are arranged for engagement with a drive wheel, which is shown in FIG. 16. The forwardly-facing and the rearwardly-facing edge 26 of the chain link is also rounded-off in a manner corresponding to the surfaces 23, so that the rounded-off edges 26 can also be used for engagement with drive wheels, cf. FIG. 16. The driving direction 24, 25 is thus optional, and the running direction can be reversed when this is desirable, merely by reversing the drive wheels, which are preferably special drive sprockets as shown in FIG. 16. In FIG. 5 are also shown the spaces 27 in which drive sprockets can engage with the belt. Since the parts on the upperside and underside of the chain link are identical, there is no restriction regarding the side on which the drive wheels are placed, even though they are naturally and normally chosen to engage with the underside of the belt. This is explained in more detail in connectionn with FIG. 20.

FIG. 1 shows an edge chain link for assembly in the left-hand side of the belt, if the running direction is 25. FIG. 2 shows a corresponding link 2h, but for assembly in the right-hand side of the belt and configured in half-breadth. The module links 3, 4 mounted between the outer links, see FIGS. 3 and 4, are also produced in several breadths, hereby providing the possibility for the construction of belts in the breadths there is use for, and also the possibility for the links to be staggered in relation to one another in the running direction like bricks in a wall (brick-laid).

In the one side of the edge chain links 1, 2, which are arranged to be outermost in the conveyor belt, they are configured with an area 18 of a greater material thickness because, as is known, the load when running in lateral curves must be transferred by the belt's edge outermost in the curve, in that the chain links' eye parts innermost in the curve are brought further in between each other, the reason being that the long holes 5 permit the rods to be displaced in the running direction in those parts of the belt in which there is no traction (e.g. innermost in a curve).

The reinforcement area 18 is so broad that in breadth it extends over an area corresponding to an eye part on each side. Moreover, it comprises a tubular area 20 which is divided by a wall 21 into two tracks or openings 19 with square, preferably rectangular clearance arranged to house side plates 7, see especially FIG. 5, said side plates being configured as shown in more detail in FIGS. 8 or 9 and as discussed later. The side plates are in engagement with the rods 5 and give the belt a very high tensile strength, depending on the material of which the side plates are made. Since their height x is less than the thickness h of the chain links, see FIG. 17, the side plates are integrated in the link's outer edge and partly enclosed herein, so that they cannot come in contact with the underlying slide surfaces and the like, or with the goods which are transported on the conveyor.

As will be seen in FIGS. 1, 2 and 5, the side plates are integrated outermost in the edge chain links, but still at a distance from the outer edge 10 of the links, which moreover is of plane configuration. Outermost, the edge chain links are configured with an eye part 12 which also has a thoughgoing opening 16 for a blocking element 8 for the transverse rod. The possibility is hereby provided for the use of special rod compositions as shown in FIG. 5, in that e.g. the rod piece 5 is a steel rod, e.g. a steel tube, while the rod piece 6 is a plastic rod. Consequently, it can be sufficient to use steel rod parts outermost where great tensile stress arises and the side plates are positioned, while use can be made of plastic rods across the rest of the breadth, i.e. over the whole centre piece of the belt. There is hereby achieved a great reduction both in weight and cost without any reduction in the tensile strength, and at the same time herewith the belt's characteristics in many other aspects are optimized.

As will appear from FIGS. 3 and 4, the module chain links are configured in completely the same manner as those parts of the edge chain links which do not form part of the reinforced edge area. Therefore, the individual parts shown in FIGS. 3 and 4 of the drawing are given the same reference numbers as the same individual parts in FIGS. 1 and 2.

As shown in FIGS. 1–4, the conveyor belt according to the invention is composed of chain links which, apart from the reinforcement area on both the upper and the underside, comprise rounded-off edges 28 so that there is low friction against slide rails etc. underneath the conveyor, and suitable conditions with regard to friction etc. for the goods which are to be transported on the conveyor. This special configuration is explained in more detail in U.S. Pat. No. 5,379,883, which belongs to the present applicant.

In FIG. 6 it is seen how the belt according to the invention is prevented from lifting outermost in a curve. In areas where there is a risk that the belt is lifted from the slide rail 42, this can be configured with or be mounted with longitudinal elements with an inclined surface 43 arranged for engagement with downwardly-facing holding elements 44 on the underside of the conveyor belt. The downwardly-facing elements 44 comprise a correspondingly inclined surface 45. The holding elements 44 are shown in more detail in FIG. 7. FIG. 6 also shows schematically the supporting structure 41 which supports the slide rail 42 and the conveyor's side plate 40. It is seen that the conveyor belt can be run at a quite short distance from the side plate 40. The principles concerning how a downwardly-facing part 44 interacts with the surface 43 are explained in more detail in the applicant's U.S. Pat. No. 5,127,515.

The holding element 44 can be moulded with the edge chain links as a one-piece unit, but can also be configured as shown in FIG. 7, i.e. arranged for mounting as required under a conveyor belt according to the invention. Each holding element is moulded in plastic as a one-piece unit. Each holding element 44 comprises a body part 46 which, as shown, comprises the inclined surface 45 and a plane top surface 47 from which two holding parts 48 extend upwards, and arranged for engagement with the rods in the conveyor belt, preferably with the steel rod parts outermost in the edge chain links. The securing parts 48 are of such a shape that they fit into the through-going openings 16, 17 in the edge chain links' eye parts, and have transverse openings 49, 50 corresponding hereto, corresponding entirely to the transverse openings in the eye parts through which the rods are introduced. The securing parts 48 thus do not hinder the possibilities of movement of the transverse rods. The effect of this form of securement is that the holding elements in the conveyor according to the invention, even under great influences, sit solidly in the edge chain links because they are in engagement with the rods.

The side plates 7 in FIG. 8 are configured as steel side plates 54. In the case shown, the side plates 54 are stamped out of 1.5 mm sheet steel, e.g. AISI 316 L, with a hardness of 490–690 N/mm$^2$, which after the stamping-out, see FIG. 8B, are slightly deformed. Each side plate has a substantially round hole 56 and an elongated hole 55 corresponding to the plastic chain link parts, and side plates of this thickness are used in pairs, see FIG. 5. Because of the deformations from the stamping-out, the side plates in each pair must be turned the same way with regard to the deformations.

The side plates in FIG. 8 provide the possibility of very great tensile strengths in the conveyor belt, e.g. up to 3–600 kg. If an even greater tensile strength is desired, the side plates can be made of special steel with high tensile strength, e.g. steel hardened either by deformation hardening or heat treatment to HRC 45 or above.

If there is need only for lower tensile strengths, but still considerably greater tensile strengths than those which can be achieved with conveyor belts without side plates, these can be moulded in plastic as shown in FIG. 9, where the side plate 59 is moulded in plastic as one unit with the holes 60, 61 and 62 corresponding to the chain links. If greater tensile strength is desired, use can be made e.g. of reinforced or fibre-strengthened plastic or nylon.

The configuration of the blocking elements 8, 9, which are moulded in plastic, is seen in greater detail in FIGS. 10 and 11.

The blocking element 9 in FIG. 10 comprises a solid part 65 with plane, parallel sides 66 and rounded-off edges so that it fits precisely down in the through-going openings 16 in the chain links, and at each side the blocking element has a projection which constitutes a locking surface 67 arranged for engagement with the transverse, round openings 14. The blocking element 9 is also tapered downwards for easier insertion in the opening 16.

The blocking element 8 in FIG. 11 similarly comprises a solid part 69 and is configured substantially as shown in FIG. 10, in that it comprises plane, parallel sides 70, but has a larger projection 71 on each side arranged as locking surface 71, the reason being that this blocking element is intended for insertion in the through-going openings 16 in those eye parts 12 which comprise the transverse, elongated holes 15.

The blocking elements 8, 9 can be inserted in the through-going openings 16 by simply being pressed herein, and can be removed again with ordinary hand tools without the chain links being ruined or damaged. The conveyor can thus be disassembled in a simple manner, e.g. in connection with repair work or the like.

With special applications of the conveyor belt according to the invention, it can be advantageous to use catch-plate elements or side-guard elements. The catch-plate elements ensure that goods on the conveyor follow with this forwards and possibly upwards or possibly downwards, while the side-guard elements ensure that the goods cannot fall sideways off the conveyor.

FIG. 12 shows an example of a catch-plate element 74 comprising a plane plate 75, e.g. with rib-shaped, stiffening rear side 76, and a transverse base part 77 which comprises downwardly-facing securing parts 78 with notches or holes 79 for engagement with the transverse rods via the through-going openings 16 in the chain links, in which the catch-plate elements can be inserted. The catch-plate elements can thus be mounted where desired and at suitable intervals on a conveyor belt according to the invention.

FIG. 13 shows a side-guard element 82 comprising a plate part 85 which is preferably plane and with increased breadth upwards. Downwards, the side-guard element comprises at least one securing part 83 with grooves or holes 84 for engagement with a transverse rod via the through-going holes 16 in the chain links, in which the side-guard elements can be inserted. The plane part 85 of the side-guard elements is preferably turned slightly, e.g. at an angle 86 in the order of 5–10° in relation to the securing part 83, so that adjacent side-guard elements project slightly in over one another at their uppermost ends when the conveyor belt is lying flat. It is hereby achieved that the elements can slide in over one another or away from one another when the conveyor belt changes direction or gradient, and such that neither in these situations is there any risk of the goods falling off the conveyor.

FIG. 14 shows an example of another type of catch-plate element, a so-called friction catch-plate, which can be mounted on the conveyor belt according to the invention. In this case, the friction catch-plate 89, e.g. of rubber or plastic, comprises an elongated, transverse, beam-like friction part 90 with a cross-section e.g. as shown in FIG. 14C, from which protrude a number of downwardly-facing securing parts 91 with notches or holes 92 for engagement with the transverse rods when the element is inserted in the through-going holes 16 in the chain links. The frictional characteristics of the top surface of the conveyor belt can hereby be changed, and the friction catch-plate can also be used as protection against wear and direct mechanical influences on the chain links if the conveyor is to be used for the transport of rough items etc.

Finally, FIG. 15 shows an example of a holding element 94 arranged preferably for use on the underside of the conveyor belt according to the invention. If, for example, the conveyor belt is used in a conveyor which changes direction from the horizontal to an inclined upwards direction, there is a tendency at the transition between the horizontal part and the part extending at an angle upwards for the belt to be lifted from the underlying slide rails. This can easily be prevented at the edge of the belt by a guide rail which extends in over the edge of the belt, but in the centre area of the belt there are problems in avoiding the lifting of the belt due to the traction which drives the belt forwards. The holding element 94 is thus mounted in one or possibly several longitudinal rows under the belt, all depending on the width of the belt. The holding element has a body part 95, from the uppermost end of which there extends a bridge part with a number of securing elements 97 corresponding fully with the securing elements described earlier, and which are arranged for engagement with the transverse rods via the through-going openings 16 in the undersides of the chain links. For holding the conveyor belt in place, the holding element comprises a transverse bridge part 96 with plane, upwardly-facing surfaces 98 arranged for engagement with a guide-strip or guide-rail on the frame under the conveyor, thus ensuring that the belt cannot be lifted from the conveyor's slide rails.

Like the parts discussed earlier, the parts shown in FIGS. 12, 13 and 15 are injection moulded as one-piece units in a suitable plastic material, and where the friction catch-plate in FIG. 14 is concerned, this is moulded as a one-piece unit in a suitable rubber, artificial rubber or soft plastic material.

It will thus be evident from the foregoing explanation that the special configuration of the chain links in the conveyor belt according to the invention, with the through-going openings 16 and the transverse rods which pass through these openings, provides the possibility for the conveyor belt to be built up for many different applications.

As discussed earlier, in FIG. 16 it is shown how a drive wheel 94 with teeth can enter into engagement with either the upper or the underside of the conveyor belt according to the invention via the openings 27 between the adjacent links. The driving direction is optional, i.e. the drive wheels' directions of rotation 24, 25 correspond to the driving directions of the conveyor belt shown earlier.

On a larger scale, FIG. 17 shows a section of a chain link in which there are through-going openings as shown earlier, both in the transverse direction and from the upperside to the underside. In the drawing is shown:

h: the height or thickness of the chain link (approx. 13 mm)
l: the length of the chain link in the running direction (approx. 35 mm)
d: the depth between adjacent eye parts (approx. 17 mm)
a: the distance between adjacent eye parts (approx. 7 mm)
b: the thickness of the eye part (approx. 5 mm)
g: the breadth of the through-going opening (approx. 2.5 mm)
c: the distance beteen the centres in each end of the elongated hole, which distance indicates the maximum possibility of movement of the transverse rod (approx. 8 mm)

The dimensions provided in brackets are those typical for a chain link for the transport of smaller articles, e.g. cans for soft drinks or the like.

By configuring the chain link for the conveyor according to the invention such that:

$b \leq a \leq 1.8 \times b$ and $2 \times a \leq d \leq 3 \times a$ i.e. such that the distance between adjacent eye parts is at least equal to the thickness of the eye part and at the most equal to 1.8× the thickness of an eye part, and that the depth of the opening between two adjacent eye parts lies between two and three times the distance between the adjacent eye parts, it is achieved that only small openings appear in the conveyor surface, so that even small items or items with point-formed bottoms do not tip over when being conveyed.

And further when $h \leq d$, the belt according to the invention can be configured with low construction height, e.g. merely 13 mm, and it is possible to continue to maintain small openings distributed evenly across the top surface. At one and the same time, there is hereby achieved a conveyor having very advantageous characteristics and great strength with only a modest consumption of material.

In FIGS. 18 and 19 are shown examples of wear elements 100, 110 moulded in one piece in suitable material with desirable heat-resistant characteristics, especially with a higher melting point than the chain links themselves. The material is e.g. nylon. The wear elements have a smooth, plane top surface 101, 111 arranged to slide against the conveyor belt's wear strips. For securing, each element has securing means 102, 112 on the underside, said means being arranged to engage with the chain links' openings 13, 14, 15 in the eye parts shown in the preceding figures, e.g. FIGS. 1–3.

FIG. 20 shows in more detail how the drive wheels engage with the conveyor belt according to the invention, both with regard to the belt's goods-supporting part and the belt's return part. With certain applications, e.g. in the transport of items or products which very easily suffer transport damage, e.g. crisp bakery products such as wafers, waffles, biscuits and the like, it cannot be accepted that the products shall be transferred from conveyor to conveyor, e.g. using normal sideways transition. Instead, very long conveyor belts are desired in the form of endless conveyors. Belts of such a size require several drive stations. With the conveyor belt according to the invention, the possibility is provided for the drive wheels to pull the belt on both the upperside and the underside. FIG. 20 shows a drive station which pulls both the conveyor belt and the return part at the same time. If several drive stations are used, the drive motors are synchronized so that an even feeding of the conveyor belt is achieved.

In FIG. 20, the top part and the return part of a long, endless belt according to the invention are indicated by 120 and 121, respectively.

The upperside of the belt is driven by the sprockets 122, and the underlying sprockets 123 are in engagement with both the underside of the top part 120 and the upperside of the return part 121. The driving sprockets 122 and 123 are permanently synchronized by means of sprockets 124 in engagement with each other. The product 125 is shielded from the sprockets by means of side plates 126. The sprockets 124 are driven from a drive shaft 127 which, e.g. is driven by a motor via a gearbox.

We claim:

1. Side-flexing conveyor belt built up of a number of chain links which are joined together in a hinge-like manner by means of transverse rods (5, 6) through openings in the individual chain links, and where at least two types of chain links are used, i.e.

a) edge chain links (1, 2) with one-sided reinforcement (18) and arranged for positioning in the outer parts of the belt, and
   b) module chain links (3, 4) arranged for positioning between the edge chain links, and where the chain links of both types can be configured in various module breadths, so that the conveyor belt can be built up in the desired breadth, and so that the individual links are staggered in relation to one another in a commonly-known manner (brick-laid), and where each link comprises
   c) a first row of eye parts (12), preferably with equally large mutual intervals between them in the transverse direction, and with elongated holes (15) which are in line with one another for insertion of a transverse rod, and
   d) a second row of eye parts (11) positioned preferably midway between the eye parts of the first-mentioned row, and with openings (13) in line with one another for insertion of a second transverse rod,
in that the two sets of eye parts are held together by a transversely-extending bridge part (22), characterized in that the one-sided reinforcement (18) of the edge links extends over at least one eye part (11, 12) for each row, so that at least one eye part is replaced by at least one traction side plate (7) in each link, in that said side plates have transverse openings (55, 56; 60, 62) corresponding to the openings (13) and elongated holes (15) in the eye parts and are in engagement with adjacent rods (5, 6).

2. Conveyor belt according to claim 1, characterized in that the side plates (7) are positioned at a distance from the outer edge (10) of the belt.

3. Conveyor belt according to claim 1, characterized in that the side plates (7) have a height (x) which is less than the height (h) of the chain link.

4. Conveyor belt according to claim 1, characterized in that each edge link comprises internal holding means or tracks (19) configured in the running direction of the belt and configured for securing of the side plates (7) so that these become integrated in the link.

5. Conveyor belt according to claim 4, characterized in that each edge link has two parallel holding means or tracks for side plates.

6. Conveyor belt according to claim 5, characterized in that the holding means or the tracks are configured in such a manner that the side plates in adjacent links are positionally held at a distance from each other.

7. Conveyor belt according to claim 1, characterized in that the side plates are of steel (54), for example special steel with high tensile strength.

8. Conveyor belt according to claim 1, characterized in that the side plates are made of plastic (59), preferably reinforced or fibre-strengthened plastic.

9. Conveyor belt according to claim 1, characterized in that all eye parts (11, 12) have a through-going opening (16, 17) from the link's upperside to the link's underside, and in that the edge links at the reinforced outer edges similarly comprise such an opening (16) positioned substantially outermost in the link, in that each opening is arranged for the insertion of a blocking element (8, 9) for the transverse rod (5, 6).

10. Conveyor belt according to claim 1 or 9, characterized in that use is made of steel rod parts in the chain links at any point along the breadth of the belt where steel rods are desired, and that the intermediate rod part is configured in another material, e.g. as a plastic rod, a plastic tube or metal tube.

11. Conveyor belt according to claim 1 or 9, characterized in that use is made of a through-going rod across the whole breadth of the belt.

12. Conveyor belt according to claim 1 or 9, characterized in that the edge chain links can further comprise holding elements (44) facing downwards from the underside and with a surface (45) arranged for contact with a rail (42, 43) arranged to prevent the lifting of the underside of the belt when running in curves.

13. Conveyor belt according to claim 12, characterized in that the downwardly-facing holding element (44) is configured as one piece integral with the edge chain link.

14. Conveyor belt according to claim 12, characterized in that the downwardly-facing holding element (44) is an independent part arranged (48) to be secured to a chain link by insertion in the through-going openings (16, 17) in the eye parts.

15. Conveyor belt according to claim 14, characterized in that the downwardly-facing holding element (44) is in engagement (49, 50) with at least one transverse rod (5, 6).

16. Conveyor belt according to claim 1 or 9, characterized in that it can further comprise a number of friction catch-plates (89) of a material with relatively high friction, e.g. rubber or plastic, and arranged to be secured on the upperside of the belt, and where each catch-plate comprises a number of securing parts (91) integral with the catch-plate and arranged for insertion in the through-going openings in the chain links.

17. Conveyor belt according to claim 1, characterized in that all module chain links, and those of the edge chain links which do not lie in the reinforcement area, are configured with a symmetrical, transverse bridge part (22), and in that the leading edges (26) of the eye parts are rounded off and symmetrical, so that driving wheels (99) can freely engage with the upperside or the underside of the belt.

18. Conveyor belt according to claim 1 or 9, characterized in that it can further comprise a number of catch-plate elements (75) or a number of side-guard elements (82), said elements along an edge or side each comprising at least one securing part (78; 83) arranged for insertion in the through-going openings in the chain links.

19. Conveyor belt according to claim 18, characterized in that the securing part or parts (78; 83) comprise at least one opening or at least one recess (79; 84) arranged for engagement with at least one rod or rod part.

20. Conveyor belt according to claim 1, characterized in that it can further comprise a number of retaining elements (94), each comprising a transverse bridge part (96) arranged to prevent the belt from being lifted up, and which opposite the bridge part comprises a number of securing parts (97) arranged for insertion in the through-going openings in the chain links.

21. Conveyor belt built up of a number of chain links which are joined together in a hinge-like manner by means of transverse rods (5, 6) through openings in the individual chain links, and where use is made of chain links of at least two types, i.e.
   a) edge chain links (1, 2) with one-sided reinforcement (18) and arranged to be positioned in the outer parts of the belt, and
   b) module chain links (3, 4) arranged to be positioned between the edge chain links,
and where the chain links of both types can be configured in various module breadths, so that the conveyor belt can be built up in the desired breadth, and so that the individual links are staggered in relation to one another in a commonly-known manner (brick-laid), and where each link comprises
   c) a first row of eye parts (12), preferably with equally large mutual intervals between them in the transverse direction, and with elongated holes (15) which are in line with one another for insertion of a transverse rod, and
   d) a second row of eye parts (11) positioned preferably midway between the eye parts of the first-mentioned row, and with openings (13) in line with one another for insertion of a second transverse rod,
in that the two sets of eye parts are held together by a transversely-extending bridge part (22), characterized in that the distance (a) between adjacent eye parts is at least equal to the thickness (b) of an eye part and at the most equal to 1.8 times the thickness of an eye part (b≦a≦1.8×b), and that the depth (d) of the opening between two adjacent eye parts lies between two and three times the distance (a) between the adjacent eye parts (2×a≦d≦3≦a).

22. Conveyor belt according to claim 21, characterized in that the height (h) of the chain links is of the same order as the depth (d) of the openings between two eye parts, though such that the height is less than the depth (h≦d).

23. Conveyor belt according to claim 1, characterized in that it further comprises a number of wear elements (100, 110) with means (102, 112) for securing in the edge of the belt while using the openings (13, 14, 15) in the eye parts.

24. Conveyor belt according to claim 23, characterized in that the wear elements are moulded as a one-piece unit in a heat-resistant material, preferably a material which is more heat-resistant than the chain links themselves, e.g. nylon.

25. Conveyor belt according to claim 21, characterized in that it further comprises a number of wear elements (100, 110) with means (102, 112) for securing in the edge of the belt while using the openings (13, 14, 15) in the eye parts.

26. Conveyor belt according to claim 25, characterized in that the wear elements are moulded as a one-piece unit in a heat-resistant material, preferably a material which is more heat-resistant than the chain links themselves, e.g. nylon.

* * * * *